US010491451B2

(12) United States Patent
Greene (10) Patent No.: US 10,491,451 B2
(45) Date of Patent: Nov. 26, 2019

(54) TIMESTAMP-BASED MATCHING OF IDENTIFIERS (71) Applicant: Parrable Inc., New York, NY (US)

(72) Inventor: Justin E. Greene, New York, NY (US)

(73) Assignee: PARRABLE INC., New York, NY (US)

(*) Notice: Subject to any disclaimer, the term of this patent is extended or adjusted under 35 U.S.C. 154(b) by 386 days.

(21) Appl. No.: 14/861,993

(22) Filed: Sep. 22, 2015

(65) Prior Publication Data

US 2017/0085522 A1 Mar. 23, 2017

(51) Int. Cl.
*H04L 12/24* (2006.01)
*H04L 29/08* (2006.01)
(Continued)

(52) U.S. Cl.
CPC ........ *H04L 41/0293* (2013.01); *G06F 16/955* (2019.01); *G06F 16/9574* (2019.01);
(Continued)

(58) Field of Classification Search
CPC . H04L 67/22; H04L 63/1441; H04L 41/0293; H04L 67/02; G06F 17/30861; G06F 16/95
See application file for complete search history.

(56) References Cited

U.S. PATENT DOCUMENTS 6,615,262 B2 9/2003 Schweitzer et al.
8,478,856 B2 7/2013 Williams et al.
(Continued)

FOREIGN PATENT DOCUMENTS

JP 2010-093556 4/2010
WO PCT/US16/53065 9/2016
(Continued)

OTHER PUBLICATIONS

PCT Application PCT/US2016/053065 International Search Report and Written Opinion dated Dec. 6, 2016.
(Continued)

*Primary Examiner* — Jeong S Park
(74) *Attorney, Agent, or Firm* — Polsinelli LLP (57) ABSTRACT Systems and methods for timestamp-based matching of identifiers are provided. Information may be stored in memory regarding a plurality of identifiers each unique to an associated website or to an associated browser. Stored information may further include one or more maps each associating a device identifier with at least one immutable browser identifier or mutable browser identifier. The device identifier may be unique to an associated computing device. Information may be received from a computing device that has used a browser to download a website, where the downloaded website includes a reference to a browser identifier specific to the downloaded website. The received information may be determined to include a timestamp and an internet protocol (IP) address. The timestamp and IP in the received information may further be determined to correspond to a computing device associated with one of the stored maps, where the corresponding computing device is identified by a corresponding device identifier. The stored map associated with the corresponding device identifier may be updated based on the referenced browser identifier.

20 Claims, 3 Drawing Sheets (51) Int. Cl.
  *G06F 16/955* (2019.01)
  *G06F 16/957* (2019.01)
  *H04L 29/12* (2006.01)
  *G06F 21/62* (2013.01)
(52) U.S. Cl.
  CPC ...... *H04L 41/0266* (2013.01); *H04L 61/1547* (2013.01); *H04L 61/609* (2013.01); *H04L 67/02* (2013.01); *H04L 67/06* (2013.01); *H04L 67/18* (2013.01); *G06F 21/6263* (2013.01)

(56) References Cited

U.S. PATENT DOCUMENTS

| | | | |
|---|---|---|---|
| 8,635,374 | B1 | 1/2014 | Pannell |
| 9,003,540 | B1* | 4/2015 | Johansson ........... H04L 63/0807 |
| | | | 713/170 |
| 9,342,617 | B1* | 5/2016 | Greene ................. G06F 16/955 |
| 9,398,091 | B2 | 7/2016 | Williams et al. |
| 9,420,324 | B2 | 8/2016 | Ravi |
| 9,602,366 | B1 | 3/2017 | Manin |
| 10,050,731 | B1 | 8/2018 | Martin et al. |
| 10,075,330 | B1 | 9/2018 | Pannell |
| 2003/0120789 | A1 | 6/2003 | Hepworth et al. |
| 2003/0152034 | A1 | 8/2003 | Zhang et al. |
| 2004/0111746 | A1 | 6/2004 | Hoang |
| 2006/0233106 | A1 | 10/2006 | Achlioptas |
| 2008/0127209 | A1* | 5/2008 | Gale ....................... G06F 9/546 |
| | | | 719/313 |
| 2009/0006861 | A1* | 1/2009 | Bemmel ................. G06F 21/31 |
| | | | 713/189 |
| 2011/0320816 | A1 | 12/2011 | Yao et al. |
| 2012/0250081 | A1* | 10/2012 | Takahashi .............. G06K 15/02 |
| | | | 358/1.15 |
| 2013/0124309 | A1 | 5/2013 | Traashahl et al. |
| 2014/0149577 | A1* | 5/2014 | Monighetti ............. H04L 67/22 |
| | | | 709/224 |
| 2014/0257999 | A1 | 9/2014 | Garcia-Martinez |
| 2015/0074258 | A1* | 3/2015 | Ferreira .............. H04L 43/0876 |
| | | | 709/224 |
| 2015/0118991 | A1 | 4/2015 | Chung et al. |
| 2015/0200863 | A1* | 7/2015 | Wu ......................... H04L 47/28 |
| | | | 709/223 |
| 2015/0262199 | A1* | 9/2015 | Taylor ................ G06Q 30/0201 |
| | | | 705/7.29 |
| 2016/0330012 | A1 | 11/2016 | Liu |
| 2017/0013070 | A1* | 1/2017 | Comstock ............... H04L 67/22 |
| 2017/0013403 | A1 | 1/2017 | Sen |
| 2018/0098196 | A1 | 4/2018 | Dal Santo et al. |
| 2018/0278509 | A1 | 9/2018 | Greene |

FOREIGN PATENT DOCUMENTS

| | | |
|---|---|---|
| WO | WO 2017/053540 | 3/2017 |
| WO | WO 2018/175342 | 9/2018 |

OTHER PUBLICATIONS

PCT Application PCT/US2018/023177 International Search Report and Written Opinion dated May 25, 2018.
U.S. Appl. No. 15/469,162 Office Action dated Mar. 22, 2019.

* cited by examiner

TIMESTAMP-BASED MATCHING OF IDENTIFIERS

CROSS-REFERENCE TO RELATED APPLICATIONS

The present patent application is related to U.S. patent application Ser. No. 14/716,187 filed May 19, 2015, now issued at U.S. Pat. No. 9,342,617, and titled "Unique Identifiers for Browsers" and U.S. patent application Ser. No. 14/861,097 filed concurrently herewith, now issued as U.S. Pat. No. 10,103,931, and titled "Session-Based Matching of Mutable Browser Identifiers," the disclosures of which are incorporated by reference herein.

BACKGROUND

Field of the Invention

The present invention generally relates to websites. More specifically, the present invention relates to timestamp-based matching of identifiers.

Description of the Related Art

The use of Internet and web resources is nearly ubiquitous throughout the industrialized world. Users generally access the Internet using any of a number of computing devices capable of communicating over a communication network, whether wirelessly or through wired connections. More specifically, the user may use a browser application on a computing device to access content on any of a number of webpages and websites hosted by one or more web servers.

Upon request, content related to a designated webpage may be downloaded to the user computing device, which may further render the webpage to be displayed. Such downloaded content may include a variety of different types of files, including documents, graphics, audio and video, etc., as well as related data (e.g., metadata, stylesheets including cascading stylesheets). The downloaded content may be stored in a browser cache in local memory of the computing device. Various elements and components of a particular webpage or website may change over time (e.g., as a publisher publishes new or updated content). Some components or elements, however, remain static and unchanged. When the user leaves the webpage and later wishes to return, the browser cache allows the computing device to retrieve static, unchanged files related to the associated webpage from local memory, rather than re-downloading the same web objects when a user wishes to revisit the webpage.

Currently, browsers do not contain or expose any unique identifiers that can be accessed and used by websites. Present websites and webpages may track and share data regarding the activity (e.g., repeat visits) of the user in relation to a particular webpage. Such data may include state information (e.g., preferences, shopping cart items), provide registration or authentication information (e.g., user names, passwords, addresses/locations), or otherwise track browsing history (e.g., which webpages were visited, a number of visits, when the visits occurred). Because nearly all aspects of modern life may be reflected in or otherwise involve Internet activity, however, some of the tracked data may be personally identifiable of a particular individual. Tracking mechanisms that encompass such personally identifiable data may therefore risk exposure of personal, confidential, and/or otherwise sensitive user information. In the interests of protecting user privacy, some jurisdictions may even have statutes or regulations restricting the type of data that may be tracked.

Meanwhile, various publishers, service providers, and related entities may be interested in obtaining statistical data regarding the user traffic that visits a given webpage or website. Although a web server may be able to identify a number of download requests for a particular webpage, such requests may be made by the same user (or the same small set of users). Such a metric may therefore fail to present an accurate picture of the traffic or user activity involving the website, while using the more particularized data discussed above may risk exposure of information that is personally identifiable of a specific user.

Moreover, users may use different browsers and visit a variety of different websites. Such variety can complicate the ability to track traffic where, for example, a user may use different browsers to visit the same website. Because such different browsers generally do not communicate or exchange information, it can be quite difficult to get a full picture of such a user may traffic the Internet.

There is, therefore, a need in the art for improved systems and methods for matching browser identifiers to a browser and/or device.

SUMMARY OF THE CLAIMED INVENTION

Embodiments of the present invention allow for timestamp-based matching of identifiers. Information may be stored in memory regarding a plurality of identifiers each unique to an associated website or to an associated browser. Stored information may further include one or more maps each associating a device identifier with at least one browser identifier. The device identifier may be unique to an associated computing device. Information may be received from a computing device that has used a browser to download a website, where the downloaded website includes a reference to a browser identifier specific to the downloaded website. The received information may be determined to include a timestamp and an internet protocol (IP) address. The timestamp and IP in the received information may further be determined to correspond to a computing device associated with one of the stored maps, where the corresponding computing device is identified by a corresponding device identifier. The stored map associated with the corresponding device identifier may be updated based on the referenced browser identifier.

Various embodiments may include methods for timestamp-based matching of identifiers. Such methods may include storing information in memory regarding one or more maps where each map associates a device identifier unique to an associated computing device with at least one browser identifier, receiving information from a computing device that has used a browser to download a website that includes a reference to a browser identifier specific to the browser, identifying that the received information includes a timestamp and an internet protocol (IP) address, determining that the timestamp and the IP address in the received information corresponds to a device identifier in one of the stored maps where the corresponding device identifier is specific to the computing device, and updating the stored map associated with the corresponding device identifier based on the referenced browser identifier.

Additional embodiments may include server systems for timestamp-based matching of identifiers. Such systems may include memory that stores information regarding one or more maps where each map associates a device identifier unique to an associated computing device with at least one browser identifier, a communication interface that receives information from a computing device that has used a browser to download a website that includes a reference to a browser identifier specific to the browser; and a processor that executes instructions to identify that the received information includes a timestamp and an internet protocol (IP) address, to determine that the timestamp and the IP address in the received information corresponds to a device identifier in one of the stored maps where the corresponding device identifier is specific to the computing device, and to update the stored map associated with the corresponding device identifier based on the referenced browser identifier.

Further embodiments include non-transitory computer-readable storage media having embodied thereon a program executable by a processor to perform a method for timestamp-based matching of identifiers as described above.

DETAILED DESCRIPTION

Embodiments of the present invention allow for timestamp-based matching of identifiers. Information may be stored in memory regarding a plurality of identifiers each unique to an associated website or to an associated browser. Stored information may further include one or more maps each associating a device identifier with at least one browser identifier. The device identifier may be unique to an associated computing device. Information may be received from a computing device that has used a browser to download a website, where the downloaded website includes a reference to a browser identifier specific to the downloaded website. The received information may be determined to include a timestamp and an internet protocol (IP) address. The timestamp and IP in the received information may further be determined to correspond to a computing device associated with one of the stored maps, where the corresponding computing device is identified by a corresponding device identifier. The stored map associated with the corresponding device identifier may be updated based on the referenced browser identifier.

Figure 1:
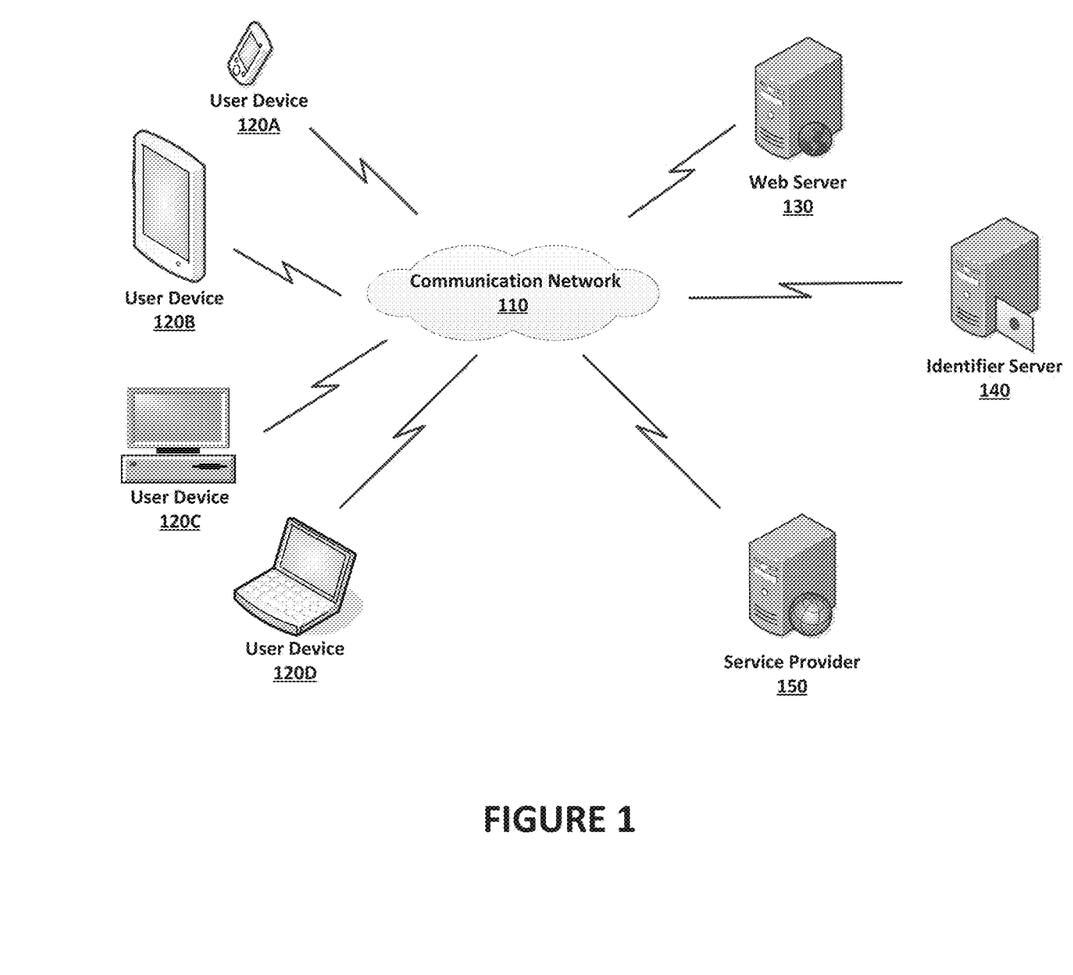
FIG. 1 illustrates an exemplary network environment in which a system for timestamp-based matching of identifiers may be implemented.

FIG. 1 illustrates a network environment 100 in which a system for matching mutable browser identifiers may be implemented. Network environment 100 may include a communication network 110, one or more user devices 120A-D, web server 130, identifier server 140, and one or more service providers 150. Devices in network environment 100 may communicate with each other via communications network 110.

Communication network 110 may be a local, proprietary network (e.g., an intranet) and/or may be a part of a larger wide-area network. The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, cellular or mobile service providers, a cable service provider, a provider of digital subscriber line (DSL) services, or a satellite service provider. Communications network 110 allows for communication between the various components of network environment 100.

Users may use any number of different electronic user devices 120A-D, such as general purpose computers, mobile phones, smartphones, smartwatches, wearable devices, personal digital assistants (PDAs), portable computing devices (e.g., laptop, netbook, tablets), desktop computing devices, handheld computing device, or any other type of computing device capable of communicating over communication network 110. User devices 120 may also be configured to access data from other storage media, such as local caches, memory cards, or disk drives as may be appropriate in the case of downloaded services. User device 120 may include standard hardware computing components such as network and media interfaces, non-transitory computer-readable storage (memory), and processors for executing instructions that may be stored in memory.

In addition, user devices 120 may include a variety of applications, including browser applications that allow the user to request certain webpages. As used herein, references to browser and browser identifier are exemplary, and teachings regarding the same are applicable to other types of applications and application identifiers (e.g., Apple IDFA, Google AdID). For example, a user may enter a uniform resource locator (URL) into a browser application. Such a browser may send such request to an associated web server (e.g., web server 130), receive responsive data (e.g., webpage file with references to other files to download), and use such responsive data to render and display the requested webpage. Webpage files that may be downloaded to the user device 120 may include not only files corresponding to content that is actually displayed as part of the webpage, but also associated files.

Web server 130, identifier server 140, and service providers 150 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Web server 130 may be any kind of server used to host web content, including any type of webpage or website data. The particular files associated with each website may be controlled by a publisher (or designated administrator). The website file may include links to files under control by other parties. In that regard, the website files downloaded from web server 130 may include a reference (e.g., URL) to a mutable browser identifier file, as well as an optional loader application (e.g., Javascript commands) and associated code library to be used with the mutable browser identifier file. Such mutable browser identifier file may be specific to the website. For example, a mutable browser identifier for a particular website may include or otherwise be based on a domain (or other characteristic) of that website. As such, each website visited by a particular user device may be associated with a unique and different mutable browser identifier.

Such mutable browser identifier may be generated and managed in manners similar to those disclosed with respect to the browser identifiers disclosed in related co-pending U.S. patent application Ser. No. 14/716,187, the disclosure of which has been incorporated by reference herein. Moreover, the mutable browser identifiers disclosed herein may be used in conjunction with the disclosed invention of related U.S. patent application Ser. No. 14/716,187. As indicated by their respective names, an immutable browser identifier does not change, while a mutable browser identifier may change. An immutable browser identifier may be associated or mapped to different mutable browser identifiers. Because a mutable browser identifier may change, various indicators associated with a referenced mutable browser identifier may be used to map that referenced browser identifier to the immutable browser identifier, its associated mutable browser identifiers, and/or an associated device identifier.

In that regard, the browser may attempt to access the referenced mutable browser identifier file, either automatically or under direction of the loader application as executed by the user device 120. Such access may include automatically checking a local browser cache to determine whether the referenced mutable browser identifier file may have already been downloaded previously.

Following such checking of the local browser cache, the user device 120 may send a request to an identifier server 140 associated with the referenced mutable browser identifier file. Such request may be indicative of whether the referenced mutable browser identifier file was found in the local browser cache (and if so, when the referenced mutable browser identifier file had last been modified). Where the request indicates that the referenced mutable browser identifier file was not found in the local browser cache, the identifier server 140 may respond by sending a new mutable browser identifier file to the user device 120. As noted above, the new mutable browser identifier may be generated so as to be unique to the particular website being downloaded (e.g., based on website domain or other characteristic).

In that regard, the identifier server 140 may generate and provide a new unique mutable browser identifier upon request. Such a unique mutable browser identifier may be specific to the website making the request. Where the user may have opted out, however, a non-unique term may be inserted in place of the unique mutable browser identifier. In some embodiments, the user may opt out of being provided with unique identifiers with respect to a designated webpage or website. Alternatively, the user may opt into being provided with unique identifiers with respect to a designated webpage or website. As such, the website may be uniquely identified via the unique mutable browser identifier for some webpages, but not others. In some embodiments, such information regarding user opt-outs or opt-ins may be reflected in the mutable browser identifier file. For example, the mutable browser identifier file may include information indicative of the user opt-in or opt-out for defined webpages, websites, or categories of websites, as well as indicators specifying the granular details under which the opt-in or opt-out are to be implemented.

The user may also opt to reset the unique mutable browser identifier associated with the website. Resetting the unique mutable browser identifier may involve clearing the local browser cache of any previously downloaded mutable browser identifier files, generating a new mutable browser identifier (in a new mutable browser identifier file), and providing the new mutable browser identifier file, which may then be cached in the local browser cache. In some embodiments, a signal may be sent to the identifier server 140 to indicate that the mutable browser identifier file needs to be updated. Such a signal may be implemented in a cookie that the identifier server 140 can read and then determine what to send back as the mutable browser identifier file. Alternatively, the request (including pass information or parameters) may be directed to a transient URL (e.g., that is structured to include the mutable browser identifier and any directives), and that request may then be redirected to the identifier server 140, which can then look at the referrer header (e.g., transient URL) of the request to parse out the requested changes to the mutable browser identifier file.

Further, the identifier server 140 may provide a plurality of mutable browser identifiers (each to a different website and provided in a different mutable browser identifier file). Activity at the user device 120 in relation to the website may thereafter be associated with the provided unique mutable browser identifier. Such mutable browser identifier may further be associated with immutable browser and/or device identifiers, thereby allowing for the ability to distinguish between different browsers on the same or different computing devices in some cases. Specifically, information may be logged regarding activity at a particular website (as identified by a unique mutable browser identifier), which may be provided to identifier server 140 (or an associated server) by a loader application at the user device 120. In that regard, the identifier server 140 may not receive the mutable browser identifier itself, as the mutable browser identifier may only be called by local applications or code (e.g., browser, loader application, local code library) resident on the user device 120. The loader application may be executed to perform a variety of functions, which may include loading and executing code from the code library. Such a code library may be provided, modified, and updated at the web server 130, identifier server 140, or other designated service provider 150.

Where the referenced mutable browser identifier file was indeed found in the local browser cache, the browser may send a request with an indicator (e.g., a "if-modified-since" header) regarding the referenced mutable browser identifier file to the identifier server 140. The identifier server 140 may then determine whether an updated version of the referenced mutable browser identifier file should be sent based on information provided in the request (e.g., whether or not a "if-modified-since" header exists for the referenced mutable browser identifier file) or associated cookies, referrer headers, etc. If the referenced mutable browser identifier file is determined to be in the local browser cache (e.g., as indicated by the existence of an associated "if-modified-since" header in the request), the identifier server 140 may validate the file and send an indicator (e.g., a "304 not modified" indicator) regarding such validation. In some embodiments, such validation may extend a maximum age or expiration date/term of the referenced mutable browser identifier file, whereby the referenced mutable browser identifier file may be maintained an extended period of time (corresponding to the extended maximum age or expiration date/term) in the local browser cache. Where the user may have opted out (e.g., as indicated by an opt-out cookie), however, the identifier server 140 may return a mutable browser identifier file with a non-unique mutable browser identifier or an opt-out identifier.

The browser may not necessarily request that the identifier server 140 validate the referenced mutable browser identifier file in some instances. In such instances, the browser may use the cached mutable browser identifier file without making any request to the identifier server 140.

In some cases, the referenced mutable browser identifier file may be determined to require an update. For example, a cookie without an "if-modified-since" header may indicate that the referenced mutable browser identifier file had previously been present but is no longer found (in whole or in part) in the local browser cache. Upon determining that such modification may have occurred (e.g., as indicated by a header or other indicator in the request), the identifier server 140 may recreate the referenced website file or send a new mutable browser identifier file to the user device 120. While the foregoing refers primarily to modification headers, any type of cache control headers (or any type of cache control commands) known in the art may be used. Cache control may involve any operation involving cache memory, including directing validation and adjusting maximum ages as desired, as well as control where the mutable browser identifier file is cached (e.g., specify local browser cache).

A mutable browser identifier file may be any type of file that may be cached in local browser cache memory, including stylesheets, JavaScript files, HTML files, text files, AJAX requests, image files, etc. Such mutable browser identifier file may allow for its content (including the mutable browser identifier, whether unique or non-unique) to be accessible to the browser and related browser applications (including a loader application). As such, the browser and related browser applications may access and use the mutable browser identifier for various operations, including logging activity.

A mutable browser identifier file may include a mutable browser identifier, which may be unique to the webpage. In some cases, the user may opt out of being provided with a unique mutable browser identifier. In such cases, a new mutable browser identifier file may be generated with a non-unique term as the mutable browser identifier. Alternatively, the mutable browser identifier file may be updated to replace the unique identifier with a non-unique term (or an opt-out identifier for defined or general opt-out).

In some embodiments, the mutable browser identifier file may further include other types of information regarding user preferences (as designated by the user), including information regarding user opt-outs or opt-ins for specific webpages. As the user changes their opt-out or opt-in settings, such information may be used to update a mutable browser identifier file. The browser may then be directed to reload the mutable browser identifier file into the local browser cache, thereby implementing the updated user settings.

The identifier server 140 may further be able to match mutable browser identifiers to a common immutable browser identifier and in some cases, to a common device identifier. In this regard, a particular user device 120 (as identified by a device identifier) may be associated with one or more browsers (as identified by a respective immutable browser identifier), each of which may be associated with one or more websites (as identified by a respective mutable browser identifier). The identifier server 140 may therefore be capable of identifying one or more such identifiers (whether website, browser, or device) when a user device requests a website using particular browser, as well as maintaining and updating maps regarding which identifiers are associated with each other.

The identifier server 140 may use various indicators to create and update such maps. For example, secure sessions (e.g., secure socket layer (SSL) sessions) may allow for session resumption, which occurs where a client and server negotiates SSL information and then later reuses that negotiated SSL information for future connections. SSL session setup is generally very time-consuming, so not having to renegotiate is therefore desirable. In order to resume a session, a client must be able to identify the session. SSL session IDs and TLS session tickets are two mechanisms that allow for the identification and resumption of a previous session.

The identifier server 140 may be called when a browser visits websites with certain scripts (e.g., that call on the domain of the identifier server 140). The identifier server 140 may therefore be able to receive session resumption data when a particular website is accessed. As such, such identifier server 140 may use such session information to determine when multiple connections are using the same session as indicated, for example, by the same SSL session ID. Thus, the identifier server 140 can then map browser IDs associated with the multiple connections together. Such a map constructed by the identifier server 140 allows for creation of a persistent set of indicators that can be used to recognize a browser even when there is not existing SSL session.

Additional indicators may be based on use of transmission control protocol (TCP) information. TCP is used by a variety of Internet-based applications, including web browsers, email, and other applications. Information associated with use of TCP by a particular device (e.g., present in a TCP packet) may be inclusive or indicative of various timestamp information, such as current time, uptime, and clock skew. In an exemplary embodiment, the identifier server 140 may receive a browser identifier (e.g., associated with TCP timestamp information, such as a particular current time, uptime, source IP address, clock skew), determine whether the associated timestamp information (e.g., uptime) matches any timestamp information previously associated with the browser identifier (and if not, update stored information regarding the browser identifier to include the associated timestamp information), determine whether the uptime (or source IP address or clock skew) maps to any device identifiers, and if so, mapping the device identifiers together.

While current time are generally included in the TCP packet, further calculations may also be applied to obtain other timestamp information (e.g., uptime and clock skew). Uptime, for example, provides a measure of time since a computing device was started and continuously working. Especially when combined with other indicators (e.g., source IP address, clock skew), the uptime may be able to uniquely identify a particular device for the duration of time before the computing device is restarted. With respect to uptime, a device may record and report a number of ticks since the last time the device was started or the number of ticks was reset. That number of ticks may reset based on different schedules for different computing devices (e.g., some devices reset every few days and others reset every few weeks). A tick may also represent a different amount of time for different systems, so there may be some device-specific calculations involved to determine how much time is represented by the reported number of ticks. The result is a time that is incrementing consistently. Calculating that backwards provides the uptime, which may be the time the device was last started or the last time the number of ticks was reset. As such, the uptime generally remains the same even as ticks increase, until such time that the uptime is reset.

Such indicators used by identifier server 140 may therefore include session identifiers (e.g., transport layer security (TLS), secure sockets layer (SSL)), transmission control protocol (TCP) identifiers (e.g., uptime, current time, clock skew), internet protocol (IP) address, user agent identifiers, and others. Such indicators may be used individually or in any combination (e.g., SSL session identifier and TCP timestamp) to identify a particular common browser and/or a particular user device 120 based on common matches. An exemplary embodiment may select a certain set of indicators based on their respective deterministic value in identifying connections between identifiers for different browsers or devices. For example, a SSL session identifier is unique to the particular session and can therefore be used to map and associate different mutable browser identifiers for the same browser together. Likewise, the combination of current time, uptime, clock skew, and source IP address is unique to a particular device, thereby allowing for connections to be drawn between different device identifiers associated with the device.

For example, a particular request to download website may refer to a mutable browser identifier that is associated with one or more indicators (e.g., SSL session identifier). Such SSL session identifier may be compared to stored information and determined by identifier server 140 as having been previously used in conjunction with a different mutable browser identifier, with an immutable browser identifier, and/or with a device identifier. Likewise, a TCP timestamp associated with the requesting computing device may be determined by identifier server 140 as having been previously mapped or used in conjunction with other mutable browser identifiers, with an immutable browser identifier, and/or with a device identifier.

Where no stored map existed for the referenced mutable browser identifier (or any of its associated indicators or identifiers), a new map may be created. Where a stored map does exist, such stored map may be updated. As such, maps having one or more of these identifiers may be created and updated based on newly incoming identifiers (associated with certain indicators) and matches with stored identifiers (associated with the same or different indicators). When the identifier server 140 finds that two different mutable browser identifiers have the same indicator (e.g., SSL session identifier), for example, the identifier server 140 may determine that the respective website are using the same browser. The lifespans, availability, and deterministic value of each indicator may vary across different browsers, user agents, and/or operating systems. As such, indicators may be used in combination to increase the likelihood of finding a match, as well as the level of confidence in such matches.

In some embodiments, the identifier server 140 may be able to determine that a request is associated with a particular browser and website (as identified by a mutable browser identifier). Instead of a "304 not modified" indicator, the identifier server 140 may return a "200 request fulfilled" indicator with a new mutable browser identifier, which may be stored by the identifier server 140 in association with or mapped to the original browser identifier. Such a scheme therefore provides for mutability of the mutable browser identifier, while maintaining its association with various other identifiers (e.g., device and immutable browser identifiers).

In some embodiments, a first party cookie may be used as the persistent identifier (e.g., mutable browser identifier) for each website. Although a cookie may persist for a time, such cookie may be changed periodically. Thereafter, various matching parameters (e.g., SSL and uptime) may be used to identify and to map associated cookies together as described in further detail below. In that regard, the identifier server 140 should be understood as having the ability to use any persistent identifier to map to other persistent identifiers. Over time, therefore, the map constructed by the identifier server 140 may grow to incorporate new connections and associations between various identifiers.

Service providers 150 may include servers or other computing devices that may provide various services based on identification of a browser. For example, a service provider 140 may use information regarding repeat visits to provide targeted advertising to repeat visitors (versus first-time visitors).

Figure 2:
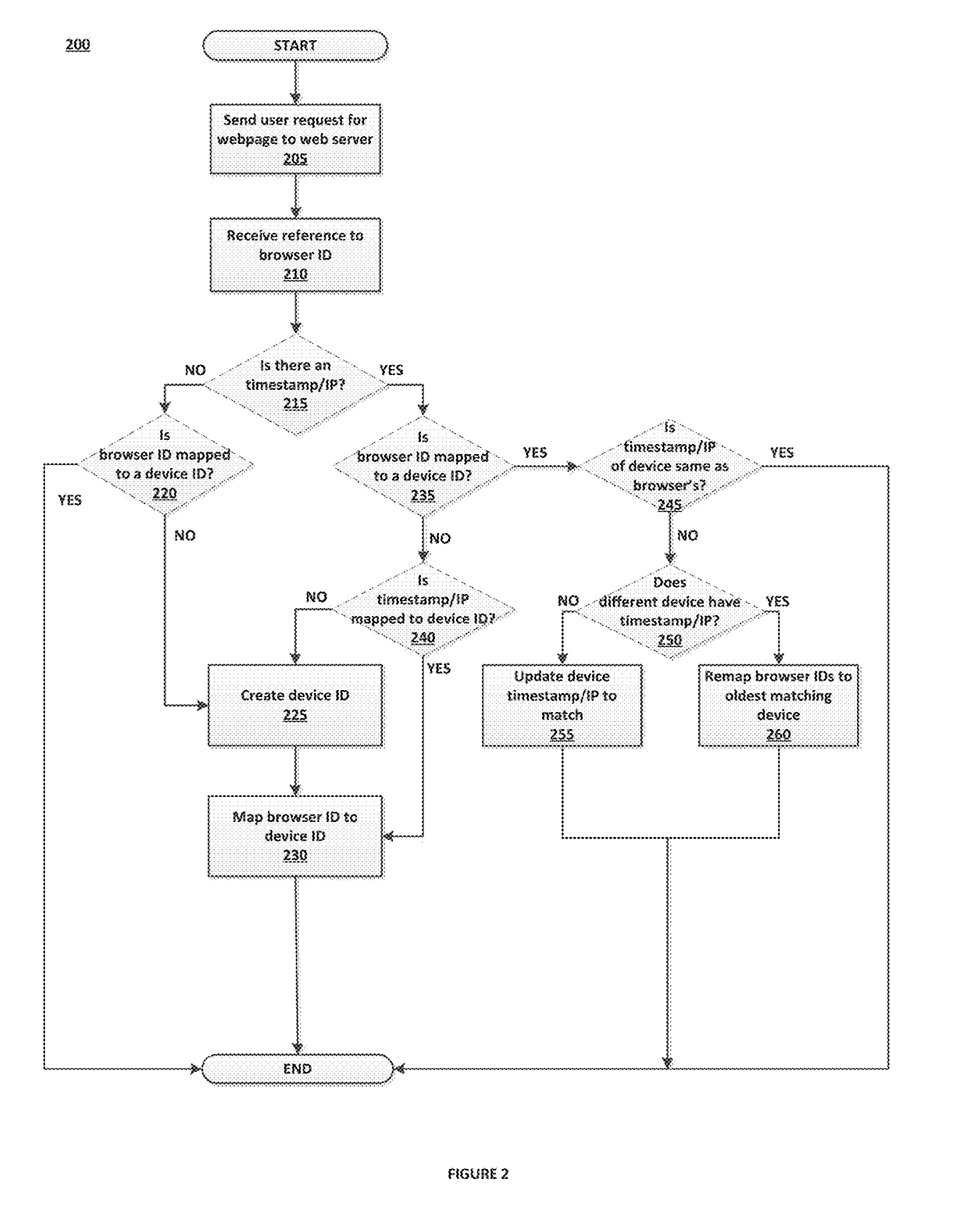
FIG. 2 is a flowchart illustrating an exemplary method for timestamp-based matching of identifiers.

FIG. 2 is a flowchart illustrating an exemplary method 200 for timestamp-based matching of identifiers. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, identifier information may be stored in memory of an identifier server 140, a reference to a browser identifier may be received, and it may be determined whether there is a timestamp and IP address associated with the referenced browser identifier. If not, the method may proceed to determine whether the referenced browser identifier is mapped to a device identifier, and if not, a device identifier may be created and mapped to the referenced browser identifier. Alternatively, the referenced browser identifier may also be matched to one or more other identifiers (e.g., device, other browsers, and/or websites). Stored information associated with the corresponding stored browser identifier may be updated based on comparing the referenced browser identifier (and its associated information) with stored browser identifier information (including maps of associated identifiers).

In step 205, identifier information may be stored in memory of an identifier server 140. The stored information may include multiple different mutable browser identifiers, immutable browser identifiers, and device identifiers, as well as maps correlating one or more such identifiers. For example, a map may associate a particular device identifier with one or more mutable browser identifiers and immutable browser identifiers. Such maps may have been generated based on previously received information regarding such associations (e.g., previously received browser identifiers mapped to a particular common device identifier), as well as updated over time. Such updates may include not only creating new associations based on newly received association data, but also updating stored associations based on any matches to the newly received information.

In step 210, a request for a particular website (e.g., as identified by a URL) may be entered by the user via a browser of a user device 120, which may send such request to the web server 130 associated with the website. The web server 130 provides website content to the browser of user device 120. Such website content may be associated with the reference to a browser identifier file. Such a reference may be another URL that resolves to identifier server 140. In some embodiments, the reference sent by the web server 140 may pertain to a loader application that is executable to reference the browser identifier file. The browser may check a local browser cache to find the referenced browser identifier file.

In step 215, it is determined whether a timestamp (e.g., TCP timestamp) and IP address is associated with the request received in step 210. If not, the method proceeds to step 220, and if yes, the method proceeds to step 235.

In step 220, it is determined whether the referenced browser identifier is already mapped to a device identifier. Such determination may be based on the stored maps in memory of the identifier server 140. If so, the method ends. If not, the method may proceed to step 225.

In step 225, a device identifier is created to uniquely identify the computing device that referenced the browser identifier.

In step 230, the referenced browser identifier is mapped to the device identifier.

In step 235, it is determined whether the referenced browser identifier can be mapped to a device identifier. Such step may be performed in a manner similar to step 220. Here, however, if the referenced browser identifier cannot be mapped to a device identifier, the method may proceed to step 240. On the other hand, if the referenced browser identifier can be mapped to a device identifier, the method may proceed to step 245.

In step 240, it is determined whether the timestamp and IP address found in the same request as the referenced browser identifier can be mapped to a stored device identifier. If not, the method may proceed to step 225 (in which the device identifier is created) before proceeding to step 230 (in which the referenced browser identifier is mapped to the device identifier). If the timestamp and IP address found in the same request as the referenced browser identifier can be mapped to a stored device identifier, however, the method may proceed directly to step 230.

In step 245, it is determined whether a timestamp and IP address associated with the mapped device identifier matches the timestamp and IP address received in the same request as the referenced browser identifier. If there is a match, the method ends. If there is no match, the method may proceed to step 250.

In step 250, it is determined whether there is another, different device identifier (e.g., of all the device identifiers stored at the identifier server 140) that is associated with a timestamp and IP address matching that of the referenced browser identifier. If not, the method proceeds to step 255, and if so, the method proceeds to step 260.

In step 255, stored information regarding the device identifier is updated to reflect the timestamp and IP address of the referenced browser identifier. As noted above, some indicators may have different deterministic value. While improbable, it is possible that two different computing devices may have the same timestamp and IP address. As such, the referenced browser identifier may be associated with a different computing device (having a different device identifier) than the computing device that that referenced the browser identifier.

In step 260, the stored maps may be updated to remap the referenced immutable browser identifier (as well as any associated mutable browser identifiers) to the other device identifier based on the matching timestamp and IP address. In some embodiments, remapping may be based on which device identifier is older.

Figure 3:
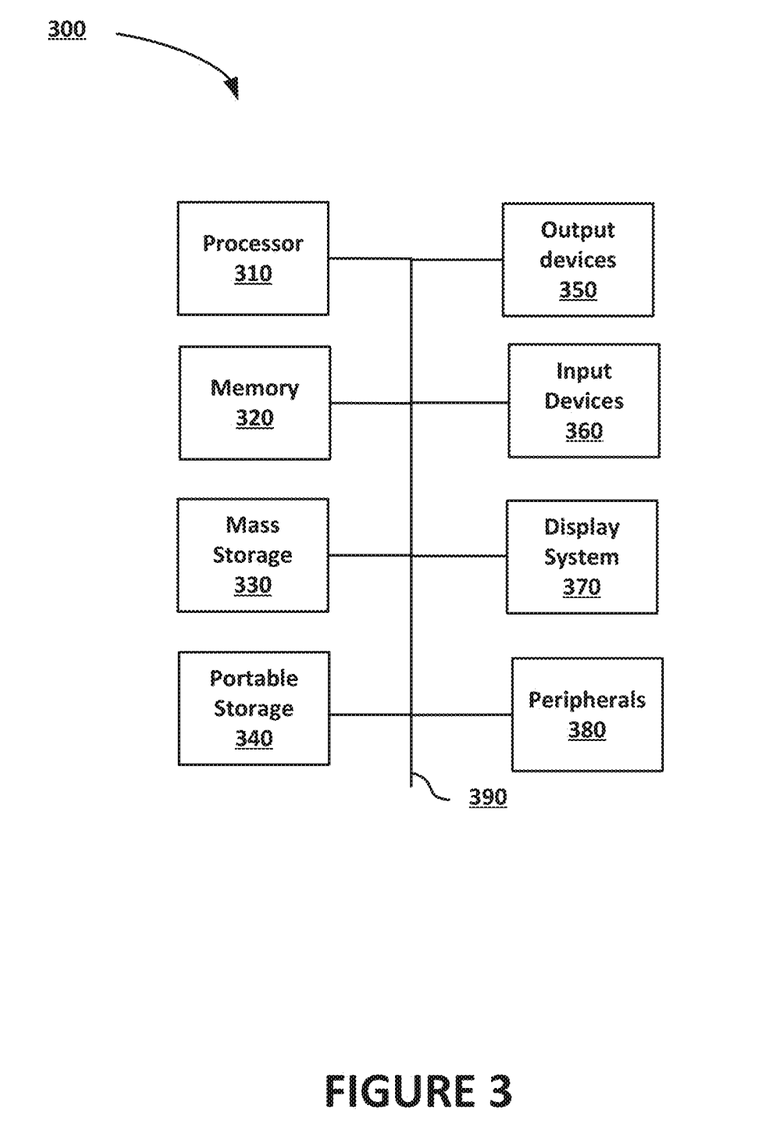
FIG. 3 illustrates an exemplary computing system that may be used to implement an embodiment of the present invention

FIG. 3 illustrates an exemplary computing system 300 that may be used to implement an embodiment of the present invention. System 300 of FIG. 3 may be implemented in the contexts of the likes of user devices 120A-D, web server 130, identifier server 140, and service provider 150. The computing system 300 of FIG. 3 includes one or more processors 310 and memory 310. Main memory 310 stores, in part, instructions and data for execution by processor 310. Main memory 310 can store the executable code when in operation. The system 300 of FIG. 3 further includes a mass storage device 330, portable storage medium drive(s) 340, output devices 350, user input devices 360, a graphics display 370, and peripheral devices 380.

The components shown in FIG. 3 are depicted as being connected via a single bus 390. However, the components may be connected through one or more data transport means. For example, processor unit 310 and main memory 310 may be connected via a local microprocessor bus 390, and the mass storage device 330, peripheral device(s) 380, portable storage device 340, and display system 370 may be connected via one or more input/output (I/O) buses 390.

Mass storage device 330, which may be implemented with a magnetic disk drive or an optical disk drive, is a non-volatile storage device for storing data and instructions for use by processor unit 310. Mass storage device 330 can store the system software for implementing embodiments of the present invention for purposes of loading that software into main memory 310.

Portable storage device 340 operates in conjunction with a portable non-volatile storage medium, such as a floppy disk, compact disk (CD) or digital video disc (DVD), to input and output data and code to and from the computer system 300 of FIG. 3. The system software for implementing embodiments of the present invention may be stored on such a portable medium and input to the computer system 300 via the portable storage device 340.

Input devices 360 provide a portion of a user interface. Input devices 360 may include an alpha-numeric keypad, such as a keyboard, for inputting alpha-numeric and other information, or a pointing device, such as a mouse, a trackball, stylus, or cursor direction keys. Additionally, the system 300 as shown in FIG. 3 includes output devices 350. Examples of suitable output devices include speakers, printers, network interfaces, and monitors.

Display system 370 may include a liquid crystal display (LCD) or other suitable display device. Display system 370 receives textual and graphical information, and processes the information for output to the display device.

Peripherals 380 may include any type of computer support device to add additional functionality to the computer system. For example, peripheral device(s) 380 may include a modem or a router.

The components contained in the computer system 300 of FIG. 3 are those typically found in computer systems that may be suitable for use with embodiments of the present invention and are intended to represent a broad category of such computer components that are well known in the art. Thus, the computer system 300 of FIG. 3 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus (e.g., bus 390) carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for tracking device activity via timestamp-based matching of identifiers, the method comprising:
    storing information in memory of an identifier server regarding one or more maps, wherein each map associates a device identifier unique to a computing device with at least one browser identifier unique to a browser used by the computing device, the map further mapping the device identifier to an internet protocol (IP) address and an uptime;
    receiving information sent over a communication network from an active computing device that has used a browser to download a website, wherein the downloaded website includes a reference to a browser identifier unique to the browser used by the active computing device;
    identifying that the received information includes a timestamp and an IP address for the active computing device, wherein the timestamp indicates an uptime of the active computing device that measures an amount of time that the active computing device has been continuously working since a last start;
    identifying that the uptime indicated by the timestamp and the IP address in the received information matches an uptime and IP address stored in association with a device identifier in one of the stored maps; and
    updating the stored map associated with the identified device identifier based on the match, wherein the updated stored map includes the referenced browser identifier and at least one other browser identifier unique to a different browser previously used by the active computing device.

2. The method of claim 1, wherein the timestamp is further associated with a clock skew, and further comprising determining whether clock skew corresponds to the active computing device.

3. The method of claim 1, wherein the updated map associates the identified device identifier with a plurality of browser identifiers, the plurality of browser identifiers including the referenced browser identifier.

4. The method of claim 3, further comprising updating the referenced browser identifier by replacing the referenced browser identifier with a new browser identifier.

5. The method of claim 4, further comprising updating the stored map associated with the identified device identifier to include the new browser identifier.

6. The method of claim 5, wherein the referenced browser identifier is further associated with at least one mutable browser identifier unique to the downloaded website, and further comprising updating the stored map to associate the new browser identifier with the at least one mutable browser identifier.

7. The method of claim 1, wherein the received information further includes a session identifier, and further comprising determining whether the received session identifier matches any session identifiers stored in memory.

8. The method of claim 1, wherein the received information further includes user agent identifier, and further comprising determining whether the received user agent identifier matches any user agent stored in memory.

9. The method of claim 8, wherein the user agent identifier is specific to an application on the active computing device.

10. The method of claim 1, wherein the stored map includes a plurality of device identifiers unique to the active computing device.

11. A server system for tracking device activity via timestamp-based matching of identifiers, the system comprising:
    memory that stores information regarding one or more maps, wherein each map associates a device identifier unique to a computing device with at least one browser identifier unique to a browser used by the computing device, the map further mapping the device identifier to an internet protocol (IP) address and an uptime;
    a communication interface that receives information sent over a communication network from an active computing device that has used a browser to download a website, wherein the downloaded website includes a reference to a browser identifier unique to the browser used by the active computing device; and
    a processor that executes instructions stored in memory, wherein execution of the instructions by a processor:
        identifies that the received information includes a timestamp and an IP address for the active computing device, wherein the timestamp indicates an uptime of the active computing device that measures an amount of time that the active computing device has been continuously working since a last start,
        identifying that the uptime indicated by the timestamp and the IP address in the received information matches an uptime and IP address stored in association with a device identifier in one of the stored maps, and
        updates the stored map associated with the identified device identifier based on the match, wherein the updated stored map includes the referenced browser identifier and at least one other browser identifier unique to a different browser previously used by the active computing device.

12. The system of claim 11, wherein the timestamp is further associated with a clock skew, and wherein the processor executes further instructions to determine whether clock skew corresponds to the active computing device.

13. The system of claim 11, wherein the stored map associates the identified device identifier with a plurality of browser identifiers, the plurality of browser identifiers including the referenced browser identifier.

14. The system of claim 13, wherein the processor executes further instructions to update the referenced browser identifier by replacing the referenced browser identifier with a new browser identifier.

15. The system of claim 14, wherein the processor executes further instructions to update the stored map associated with the identified device identifier to include the new browser identifier.

16. The system of claim 15, wherein the referenced browser identifier is further associated with at least one mutable browser identifier unique to the downloaded website, and further comprising updating the stored map to associate the new browser identifier with the at least one mutable browser identifier.

17. The system of claim 11, wherein the received information further includes a session identifier, and wherein the processor executes further instructions to determine whether the received session identifier matches any session identifiers stored in memory.

18. The system of claim 11, wherein the received information further includes user agent identifier, and wherein the processor executes further instructions to determine whether the received user agent identifier matches any user agent stored in memory.

19. The system of claim 18, wherein the user agent identifier is specific to an application on the active computing device.

20. A non-transitory computer-readable storage medium, having embodied thereon a program executable by a processor to perform a method for tracking device activity via timestamp-based matching of identifiers, the method comprising:

storing information in memory of an identifier server regarding one or more maps, wherein each map associates a device identifier unique to a computing device with at least one browser identifier unique to a browser used by the computing device, the map further mapping the device identifier to an internet protocol (IP) address and an uptime;

receiving information sent over a communication network from an active computing device that has used a browser to download a website, wherein the downloaded website includes a reference to a browser identifier unique to the browser used by the active computing device;

identifying that the received information includes a timestamp and an IP address for the active computing device, wherein the timestamp indicates an uptime of the active computing device that measures an amount of time that the active computing device has been continuously working since a last start;

identifying that the uptime indicated by the timestamp and the IP address in the received information matches an uptime and IP address stored in association with a device identifier in one of the stored maps; and updating the stored map associated with the identified device identifier based on the match, wherein the updated stored map includes the referenced browser identifier and at least one other browser identifier unique to a different browser previously used by the active computing device.

* * * * *